US007381135B2

(12) United States Patent
Hosaka

(10) Patent No.: US 7,381,135 B2
(45) Date of Patent: Jun. 3, 2008

(54) DISPLAY METHOD, DISPLAY APPARATUS FOR GAME MACHINE, AND GAME MACHINE

(75) Inventor: Toshiyuki Hosaka, Motsumoto (JP)

(73) Assignee: Seiko Epson Corporation (JP)

( * ) Notice: Subject to any disclaimer, the term of this patent is extended or adjusted under 35 U.S.C. 154(b) by 665 days.

(21) Appl. No.: 10/608,769

(22) Filed: Jun. 27, 2003

(65) Prior Publication Data

US 2004/0053688 A1 Mar. 18, 2004

(30) Foreign Application Priority Data

Jun. 28, 2002 (JP) ............................ 2002-191086
Mar. 24, 2003 (JP) ............................ 2003-080724

(51) Int. Cl.
*A63F 9/24* (2006.01)
*A63F 13/00* (2006.01)

(52) U.S. Cl. ............................ 463/34; 463/31; 463/20

(58) Field of Classification Search ............ 463/16–21, 463/30–34, 40, 42
See application file for complete search history.

(56) References Cited

U.S. PATENT DOCUMENTS 4,918,531 A 4/1990 Johnson
6,398,647 B1 6/2002 Hirai et al.
6,517,433 B2 * 2/2003 Loose et al. .................. 463/20
6,556,265 B1 4/2003 Murade
6,638,165 B2 * 10/2003 Uchiyama et al. ............ 463/20
6,688,980 B2 2/2004 Hirai et al.
6,817,946 B2 * 11/2004 Motegi et al. ................ 463/31
6,846,238 B2 * 1/2005 Wells .......................... 463/39
6,849,238 B2 * 2/2005 Weyl et al. .................... 422/94
6,971,771 B2 * 12/2005 Hosaka ........................ 362/293
2003/0027631 A1 * 2/2003 Hedrick et al. ............... 463/29
2003/0032478 A1 * 2/2003 Takahama et al. ............ 463/30
2004/0029636 A1 * 2/2004 Wells .......................... 463/32

FOREIGN PATENT DOCUMENTS

CN 2254615 Y 5/1997

* cited by examiner

*Primary Examiner*—Xuan M. Thai
*Assistant Examiner*—Frank M. Leiva
(74) *Attorney, Agent, or Firm*—Harness, Dickey & Pierce, P.L.C.

(57) ABSTRACT

A display method is provided which can let a player continue a game without fatigue or boredom. In the display method, a moving image Gt1 is projection displayed on a predetermined area in the game portion of a game machine from the rear thereof, and a still image Gb1 is projection displayed on the game portion 21*a* outside the predetermined area from the rear thereof. The projection displays are presented in such a way that the size of the predetermined area for displaying the moving image Gt1, the position of the predetermined area and the number of such predetermined areas are set as parameters, and at least one of the parameters is altered at a predetermined time during the display of the moving image Gt1 and the still image Gb1.

16 Claims, 14 Drawing Sheets

DISPLAY METHOD, DISPLAY APPARATUS FOR GAME MACHINE, AND GAME MACHINE

BACKGROUND OF THE INVENTION

1. Technical Field

The present invention relates to a display method in which an image is projection displayed by a rear projection method, a display apparatus for a game machine, and a game machine.

2. Related Art

One type of game machine known as a pachinko machine (Japanese upright pinball game) is disclosed in JP-UM-A-7-24381 and is capable of projecting an image onto a translucent optical-image display portion (2) of a front panel (1) using a rear-projector (4). In the pachinko machine, the projector emits a light image (projection light), and a projection lens (5) interposed between the projector and the front panel enlarges the projection light emitted by the projector. Thus, the projection light is projected on the translucent optical-light image display portion of the front panel, and the image is projects on the translucent optical-light image display portion. In this case, in the pachinko machine, features such as the directions of the projector and the projection lens are adjusted beforehand, whereby the display position and display size of the image to be projection displayed are fixedly set.

Conventional pachinko machines have some improvements as follows. The position and size of the image to be projection displayed are fixedly set in this pachinko machine beforehand, and the image of identical size is displayed at the identical position throughout a game. In this case, in displaying, for example, a moving image in which numerals are scrolled to display lottery states, the display size of the image is set large in order that a game player may visually recognize the lottery states and a lottery result without fail. Therefore, the player is rather fatigued as the motion of the image lies in the player's visual field at all times. On the other hand, in a case where the display size of the image is set small, image contents to be displayed are restricted, and the image becomes monotonous, so that the player is easily bored. It is thus advisable to take steps to enable the player to continue the game without fatigue or boredom.

The present invention has been made in view of such problems, and has as one object to provide a display method, a display apparatus for a game machine, and a game machine which can let a player continue a game without fatigue or boredom.

SUMMARY

In order to accomplish the above and other objects, in a display method according to the invention, a moving image is projection displayed on a predetermined area of a game board of a game machine from the rear thereof, and a still image is projection displayed on the game board outside the predetermined area. The position, the number, and the size of the predetermined area where the moving picture is displayed are set as parameters, and at least one of the parameters is altered at a predetermined time during the display of the moving image and the still image.

In a display method according to the invention, at least one of the parameters is altered when the predetermined time equals a time of a game state change in the game machine.

In a display method according to the invention at least one of the parameters is altered when the predetermined time equals a time at which a player has come close to or moved away from the game machine by a predetermined distance.

In a display method according to the invention, a game machine information image showing game machine information of the game machine is projection displayed as the still image.

In a display method according to the invention, a broadcast or distributed image is projection displayed as at least one of the moving image and the still image.

A display apparatus for a game machine according to the invention has a projection mechanism which is constructed so as to be capable of projection displaying images on a game board of a game machine from the rear thereof. The apparatus also has a control unit which causes the projection mechanism to projection display the moving image on a predetermined area in the game board and also causes the projection mechanism to projection display the still image on the game board outside the predetermined area. The control unit causes the projection mechanism to present the projection displays in such a way that the size of the predetermined area for projection displaying the moving image, the position of the predetermined area and the number of such predetermined areas are set as parameters and changes at least one of the parameters at a predetermined timing during the display of the moving image and the still image.

In a display apparatus for a game machine according to the invention, the control unit causes the projection mechanism to present the projection displays in such a way that at least one of the parameters is altered when the predetermined time equals a time of a game state change in the game machine.

A display apparatus for a game machine according to the invention is constructed so as to be capable of inputting a game machine information image expressive of game machine information of the game machine. The control unit causes the projection mechanism to projection display the game machine information image as the still image.

A display apparatus for a game machine according to the invention is constructed so as to be capable of inputting a broadcast or distributed image. The control unit causes the projection mechanism to projection display the broadcast or distributed image as at least one of the moving image and the still image.

A game machine according to the invention comprises the above display apparatus for a game machine, and a main control unit which causes the display apparatus for a game machine to projection display the moving image and the still image.

A game machine according to the invention has a user sensor that outputs a sensor signal permitting discrimination as to whether or not a player has come within a predetermined distance of the game machine. The main control unit causes the display apparatus for a game machine to projection display the moving image and the still image in such a way that at least one of the parameters is altered when the predetermined time equals at least one of the times at which the main control unit has determined that the player has come within the predetermined distance of the game machine, on the basis of the sensor signal outputted by the user sensor, and the time when the main control unit has determined that the player has moved away from the game machine by more than the predetermined distance, on the basis of the sensor signal.

A display apparatus for a game machine according to the invention consists in the above display apparatus for a game machine, in which the control unit causes the projection mechanism to present the projection displays in such a way that at least one of the parameters is altered when the predetermined time equals at least one of the times at which the control unit has determined that a player has come within a predetermined distance of the game machine, on the basis of a sensor signal outputted by a user sensor, and the time at which the control unit has determined that the game player has moved away from the game machine by more than the predetermined distance, on the basis of the sensor signal.

A game machine according to the invention comprises the above display apparatus for a game machine.

According to any of the display methods, the display apparatuses for game machines, and the game machines described above, the size of the predetermined area for projection displaying the moving image on the game board, the position of the predetermined area and the number of such predetermined areas are set as the parameters. At least one of the parameters is altered at a predetermined time during display, whereby the moving image is displayed with a small size in, for example, an ordinary game state or a lottery state, and thus, the game player can continue a game without fatigue. When a big prize, for example, has occurred, the moving image is displayed with a large size, and changes are made in the image, whereby the player can continue the game without boredom.

At least one of the parameters is altered at the time of a game state change, whereby the player can reliably recognize the change of the game state. When the player has come close to or moved away from the game machine by a predetermined distance, at least one of the parameters is altered, whereby the size of the moving image to be projection displayed, the position of the moving image or the number of such moving images can be automatically changed-over in accordance with the presence or absence of a player. Therefore, any game machine in a state where a game is not being played can be effectively utilized as a presentation game machine. The game machine information image expressive of the game machine information is projection displayed, whereby various information items on the game machine can be offered to the player while the player keeps playing the game. The broadcast or distributed image is projection displayed, whereby the player can continue the game while the player is enjoying, for example, television broadcasting. Therefore, the player can continue the game for a long time.

DETAILED DESCRIPTION

Now, preferred embodiments of game machines according to the invention will be described with reference to the accompanying drawings.

Figure 1:
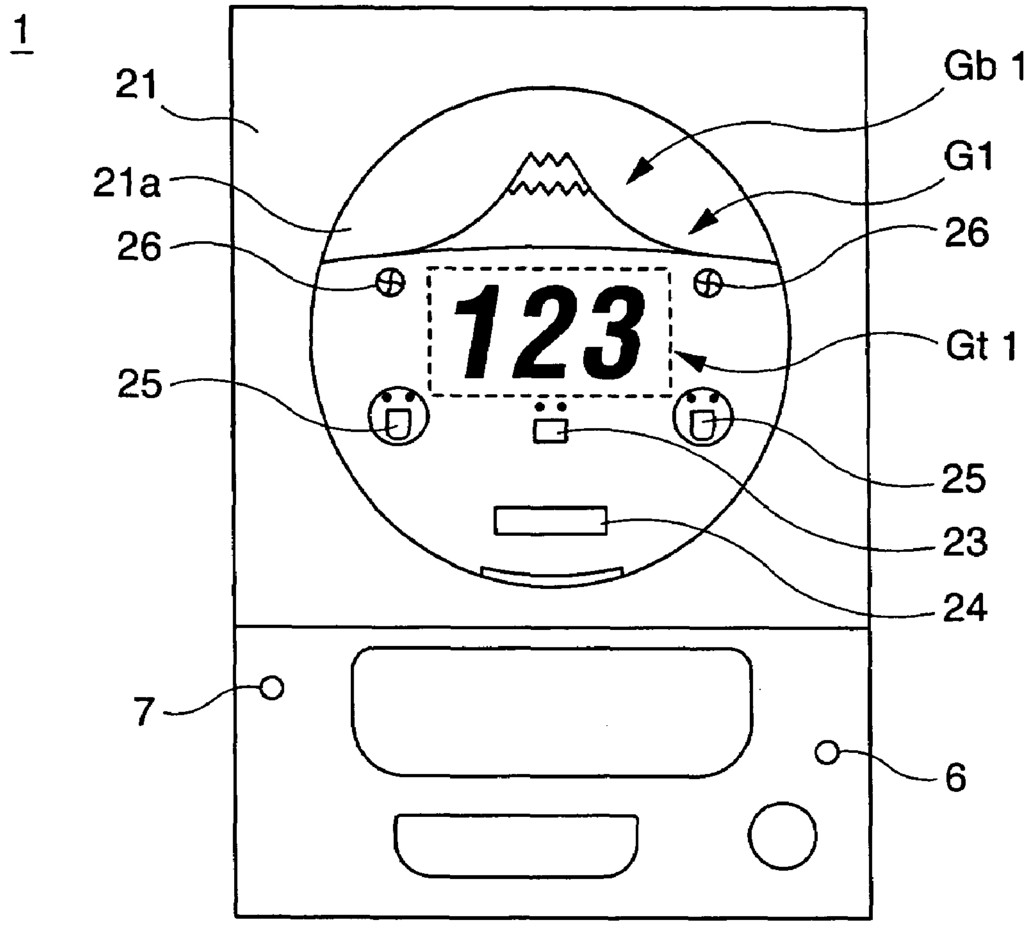
FIG. 1 is a front view showing the schematic construction of a pachinko machine according to an embodiment of the invention.
Figure 2:
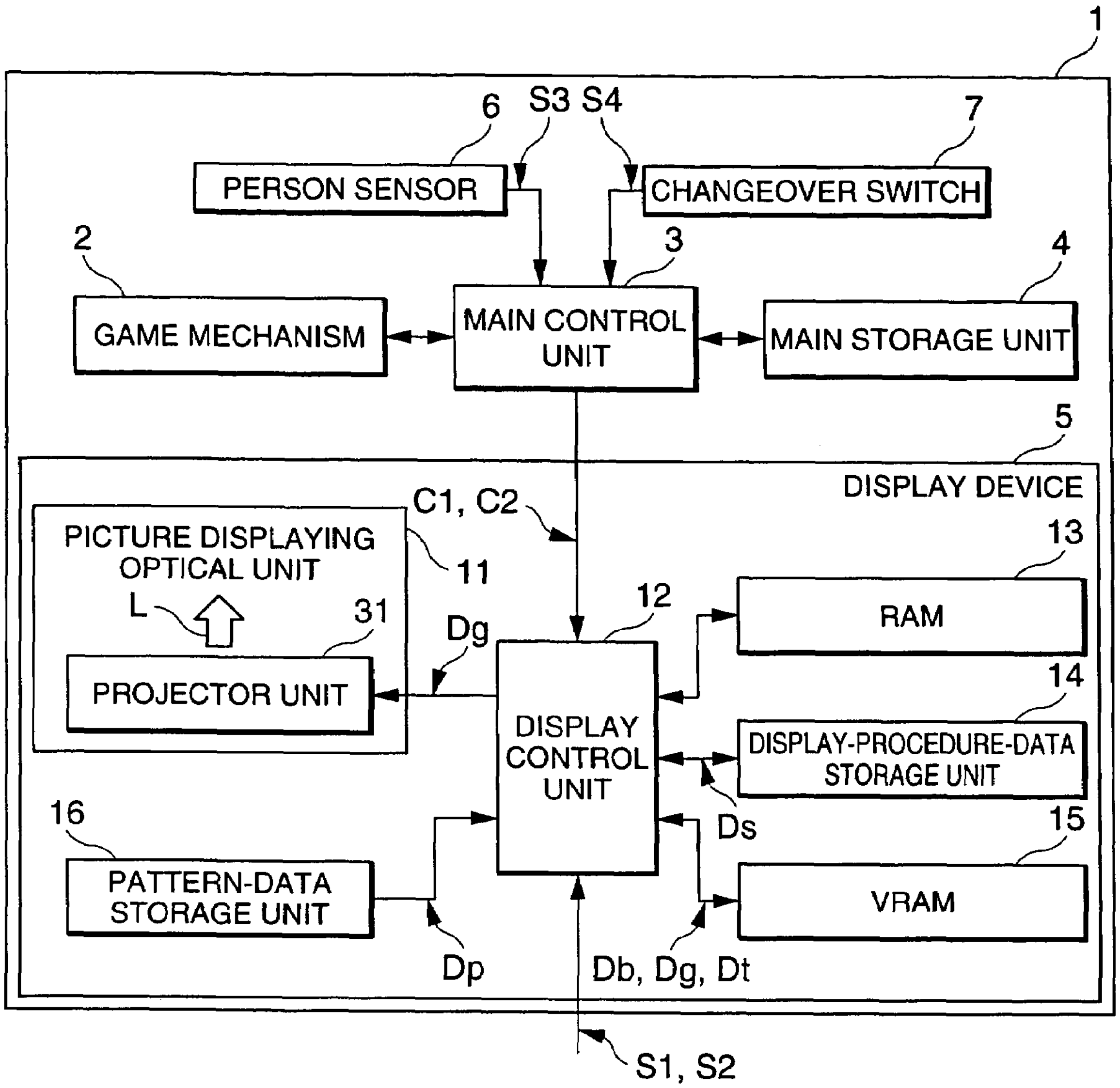
FIG. 2 is a block diagram showing the construction of the pachinko machine.
Figure 3:
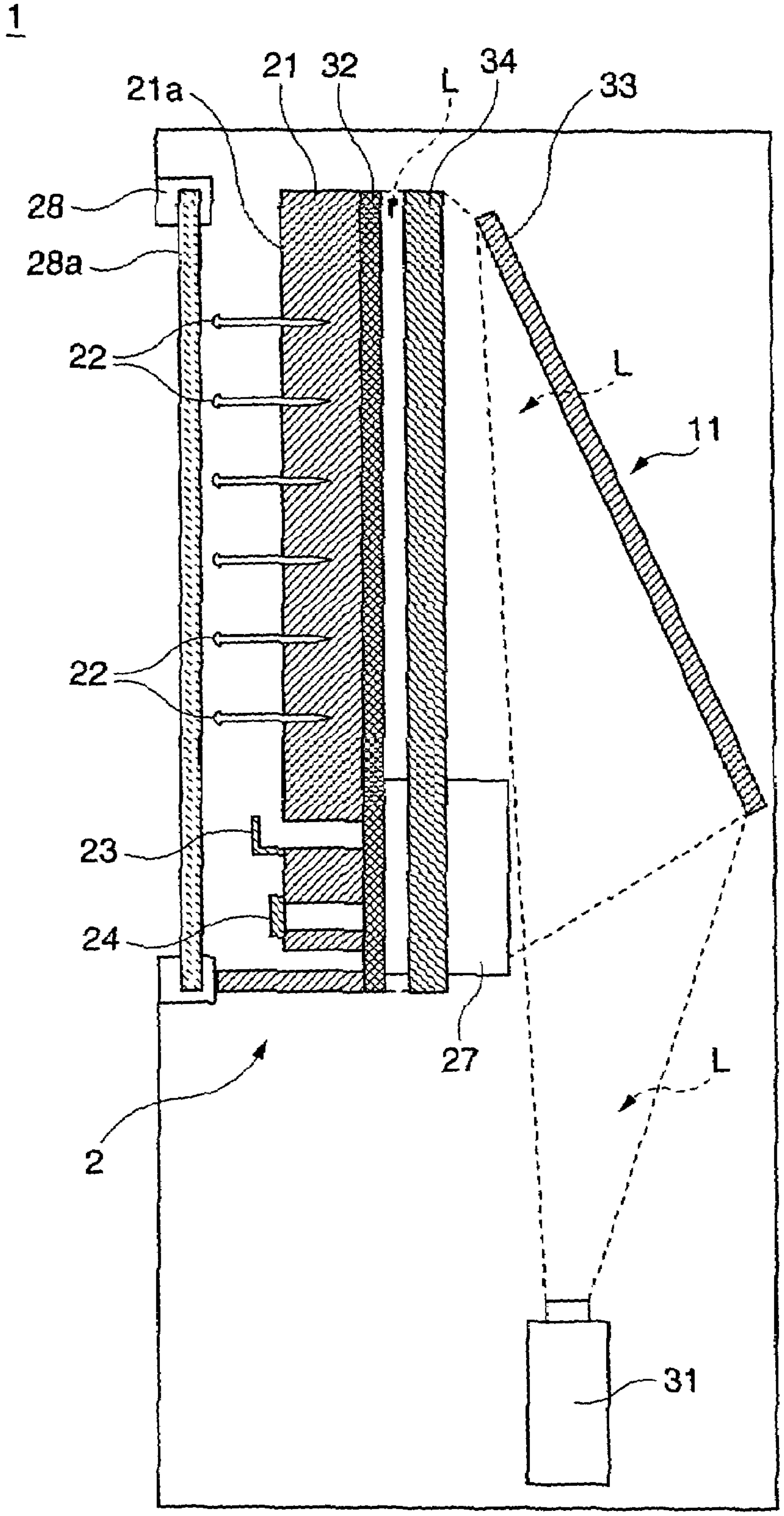
FIG. 3 is a side sectional view showing the schematic construction of the pachinko machine.

First of all, the construction of a pachinko machine 1 will be described with reference to the drawings. The pachinko machine (game machine) 1 is, for example, one of a "Seven Machine" type in which a "big prize" is given by lot. By way of example, it is so constructed that, as shown in FIG. 1, a display screen G1 in which a moving image Gt1 (numerals "123" shown in the figure) and a still image Gb1 (the ground and Mt. Fuji shown in the figure) are combined and can be projection displayed on the game portion (game board) 21*a* (inside a circle shown in the figure) of a game panel 21 by a rear projection scheme. Specifically, the pachinko machine 1 is constructed with a game mechanism 2, a main control unit 3, a main storage unit 4, a display device 5, a user sensor 6 and a changeover switch 7 as shown in FIG. 2. The game mechanism 2 is constructed with the game board 21 and a gating mechanism 27 as shown in FIG. 3. The game board 21 is formed of a light transmitting resin as a whole. In the game portion 21*a* of the game board 21, a plurality of nails 22, 22 . . . are fixed, and a start chucker 23, a big prize hole (attacker) 24, prize holes 25, 25 (refer to FIG. 1), pinwheels 26, 26 (refer to FIG. 1), etc. are disposed. A door 28 in which a transparent glass 28*a* is fitted is disposed in front of the game board 21. The gating mechanism 27 is mounted in rear of the game board 21 so as to open and shut the big prize hole 24.

The main control unit 3 controls the entire pachinko machine 1, and causes a display control unit 12 to execute image display processing by outputting commands C1, C2. In this case, the main control unit 3 outputs the command C1 for projection displaying various images, on the basis of the change (for example, the start of a lottery or the awarding of the big prize) of the game state of the pachinko machine 1, and a sensor signal S3 outputted by the user sensor 6. The main control unit 3 outputs the command C2 for projection displaying a machine information image (game machine information image) Gj shown in FIG. 5 and a television image (broadcast or distributed image in the invention) Gtv shown in FIG. 6, on the basis of an image changeover signal S4 outputted by the changeover switch 7. In this case, the machine information image Gj displays various information items such as the hit frequencies of the pachinko machine 1 and another pachinko machine 1. The main storage unit 4 stores therein the operation program of the pachinko machine 1, etc.

The display device 5 is constructed with an image displaying optical unit 11, the display control unit 12, a RAM 13, a display-procedure-data storage unit 14, a VRAM 15 and a pattern-data storage unit 16. As shown in FIG. 3, the image displaying optical unit 11 includes a projector unit 31, a screen film 32, a mirror 33 and a Fresnel lens 34. The projector unit 31 corresponds to a projection mechanism in the invention, and emits projection light L which has been modulated on the basis of displaying image data Dg outputted by the display control unit 12. Specifically, the projector unit 31 is constructed with, for example, a light source lamp, modulation means for modulating white light emitted by the light source lamp, into the projection light L (by way of example, a liquid-crystal light valve with a liquid crystal panel, an incident-side polarizing plate and an irradiation side polarizing plate), and a projection lens for enlarging the projection light L (none shown). In this case, the projector unit 31 is disposed at a position near the bottom of the pachinko machine 1 in the interior thereof, and it emits the projection light L upwards by way of example. The screen film 32 is affixed on the rear surface of the game board 21, and it receives the projection light L emitted by the projector unit 31, thereby projecting, for example, the display screen G1 shown in FIG. 1. The mirror 33 reflects the projection light L emitted by the projector unit 31, toward the screen film 32. The Fresnel lens 34 transforms the projection light L into parallel light, broadly speaking, and projects the parallel light onto the screen film 32.

The display control unit 12 is a control unit exclusively for displaying images, and executes various image display processing in compliance with the commands C1, C2 outputted by the main control unit 3, etc. Specifically, the display control unit 12 generates moving image data Dt and still image data Db for projection displaying a moving image and a still image designated for one or more display areas by display procedure data Ds, respectively, in accordance with the display procedure data Ds designated by the command C1. On this occasion, the areas and positions of the respective display areas are also designated by the display procedure data Ds. The display control unit 12 outputs the displaying image data Dg by combining both the generated image data Dt, Db and thus causes the projector unit 31 to emit the projection light L for projection displaying, for example, the display screen G1 shown in FIG. 1. Further, when the command C2 has been outputted by the main control unit 3, the display control unit 12 outputs the displaying image data Dg for projection displaying the machine information image Gj shown in FIG. 5 and the television image Gtv shown in FIG. 6, on the basis of a machine information image signal S1 and a television image signal S2 which are inputted from outside the pachinko machine 1.

The RAM 13 temporarily stores therein the various data generated by the display control unit 12. The display-procedure-data storage unit 14 stores therein the display procedure data Ds in which the designation of patterns for use in respective images, the number of display areas for projection displaying the respective images, the sizes of the respective display areas, the positions of the respective display areas, etc. are described, and the operation program of the display control unit 12. The VRAM 15 stores therein the moving image data Dt, still image data Db and displaying image data Dg which are generated in such a way that moving images and still images corresponding to various pattern data Dp are virtually depicted by the display control unit 12. The pattern-data storage unit 16 stores therein the various pattern data Dp (data of the ground, Mt. Fuji, fireworks, numerals, etc.) for generating the moving image data Dt and the still image data Db.

As shown in FIG. 1, the user sensor 6 and the changeover switch 7 are disposed on the front panel of the pachinko machine 1. In this case, the user sensor 6 outputs the sensor signal S3 to the main control unit 3 when a player has come close thereto within a predetermined distance range, and it stops outputting the sensor signal S3 when the player moves away therefrom beyond a predetermined distance range. That is, the user sensor 6 outputs the sensor signal S3 while the player is seated at the pachinko machine 1 by way of example, and it stops outputting the sensor signal S3 when the player has left the player seat. The changeover switch 7 is a switch for changing-over, for example, the display and non-display of each of the television image Gtv and the machine information image Gj, and it outputs the image changeover signal S4 to the main control unit 3 in accordance with a changeover operation.

Next, the general operation of the pachinko machine 1 will be described with reference to the drawings. In this pachinko machine 1, when a power source is turned ON, the main control unit 3 first outputs the command C1 for projection displaying the display screen G1 in which the moving image Gt1 and the still image Gb1 are combined as shown in FIG. 1. Subsequently, the display control unit 12 executes image display processing in compliance with the command C1 outputted by the main control unit 3. In the image display processing, the display control unit 12 first loads the display procedure data Ds designated by the command C1, from the display-procedure-data storage unit 14. Secondly, the display control unit 12 loads the pattern data items Dp which are respectively required for generating the moving image data Dt for projection displaying the moving image Gt1 and the still image data Db for projection displaying the still image Gb1, from the pattern-data storage unit 16 in accordance with the display procedure. Subsequently, the display control unit 12 generates the moving image data Dt and the still image data Db on the basis of the pattern data items Dp, respectively, and it combines both the data Dt, Db and virtually depicts them on the virtual plane of the VRAM 15, thereby generating the displaying image data Dg. Consecutively, the display control unit 12 outputs the displaying image data Dg included in the VRAM 15, to the projector unit 31. The display control unit 12 iteratively executes the processing until the new command C1 is inputted.

On the other hand, the projector unit 31 emits the projection light L for projection displaying the display screen G1, on the basis of the outputted displaying image data Dg. Thus, the projection light L is projected by the screen film 32, and the display screen G1 shown in FIG. 1 is projection displayed on the game portion 21*a* of the game board 21. In this case, the moving image Gt1 is a moving image for a presentation and is projection displayed in the standby state of the pachinko machine 1 (the state where the player is not seated). By way of example, the moving image is composed of three numerals, for which either the colors change or which repeats enlarging and reducing movements at random. The display area of the moving image Gt1 (area indicated by a broken line in the figure) is set large centrally on the game portion 21*a*.

Figure 4:
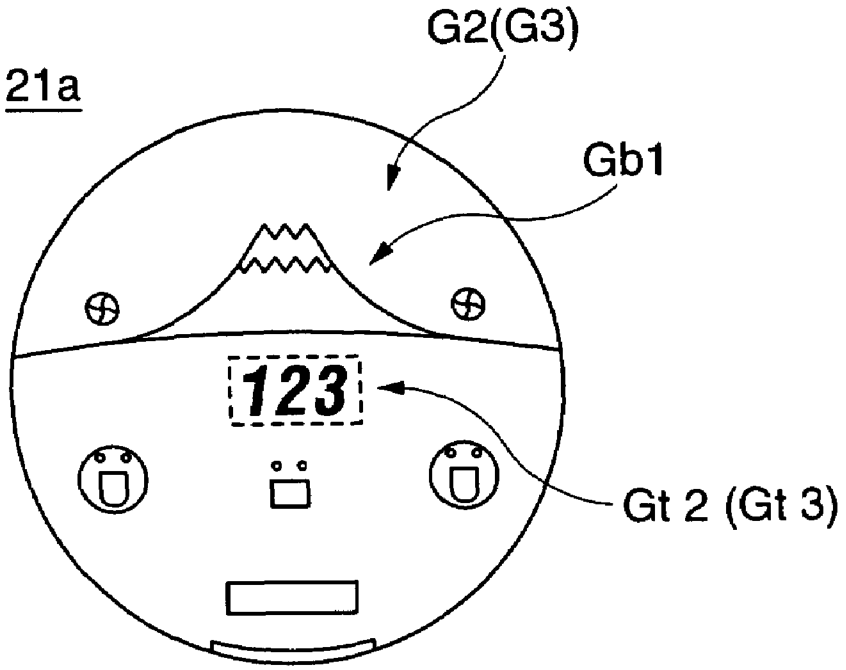
FIG. 4 is a front view of a game portion in a state where a display screen G2 (or G3) is displayed.

Next, when the player has taken the seat of the pachinko machine 1, the user sensor 6 outputs the sensor signal S3. In response to this signal, the main control unit 3 outputs the command C1 for projection displaying, for example, a display screen G2 in which a moving image Gt2 and the still image Gb1 are combined as shown in FIG. 4. Subsequently, the display control unit 12 outputs the displaying image data Dg for projection displaying the display screen G2, in the same manner as the contents of the above image display processing, and the projector unit 31 emits the projection light L for projection displaying the display screen G2. Thus, the display screen G2 shown in FIG. 4 is projection displayed. In this case, the moving image Gt2 is a moving image for an ordinary game state (a state where a shot ball has not entered into the start chucker 23), and it is projection displayed on a display area (the area indicated by a broken line in the figure) which is set small centrally on the game portion 21*a*. Consecutively, when a shot ball has entered into the start chucker 23, the main control unit 3 executes a lottery, and it outputs the command C1 for projection displaying, for example, a display screen G3 in which a moving image Gt3 and the still image Gb1 are combined as shown in FIG. 4. Subsequently, the display control unit 12 outputs the displaying image data Dg for projection displaying the display screen G3, whereby the display screen G3 is projection displayed on the game portion 21*a*. In this case, the moving image Gt3 is an image for a lottery state, and it is composed of, for example, three-digit numerals of 0 to 9 scrolled within its display area (the same display area as that of the moving image Gt2 shown in the figure).

Figure 5:
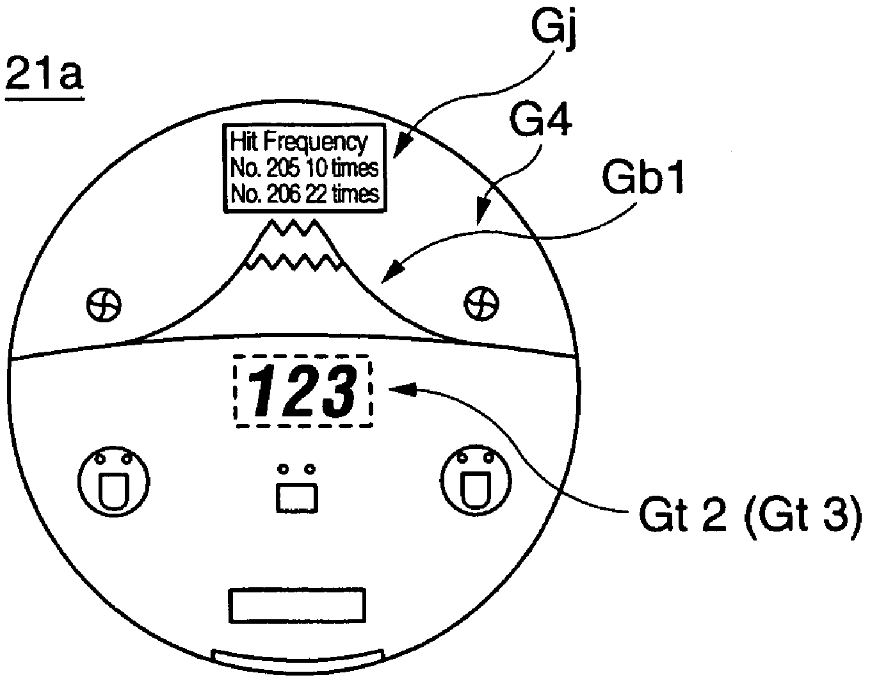
FIG. 5 is a front view of the game portion in a state where a display screen G4 is displayed.
Figure 6:
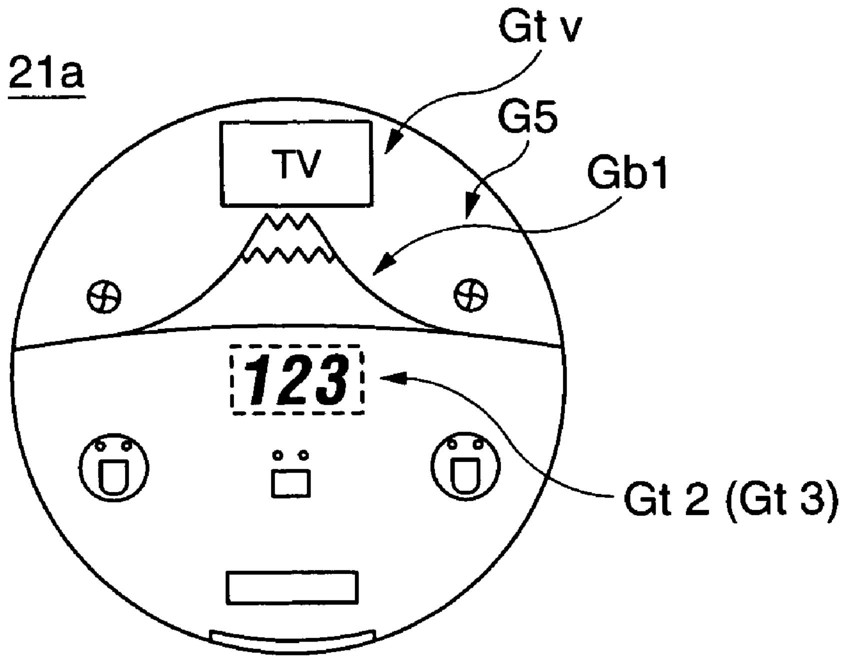
FIG. 6 is a front view of the game portion in a state where a display screen G5 is displayed.
Figure 7:
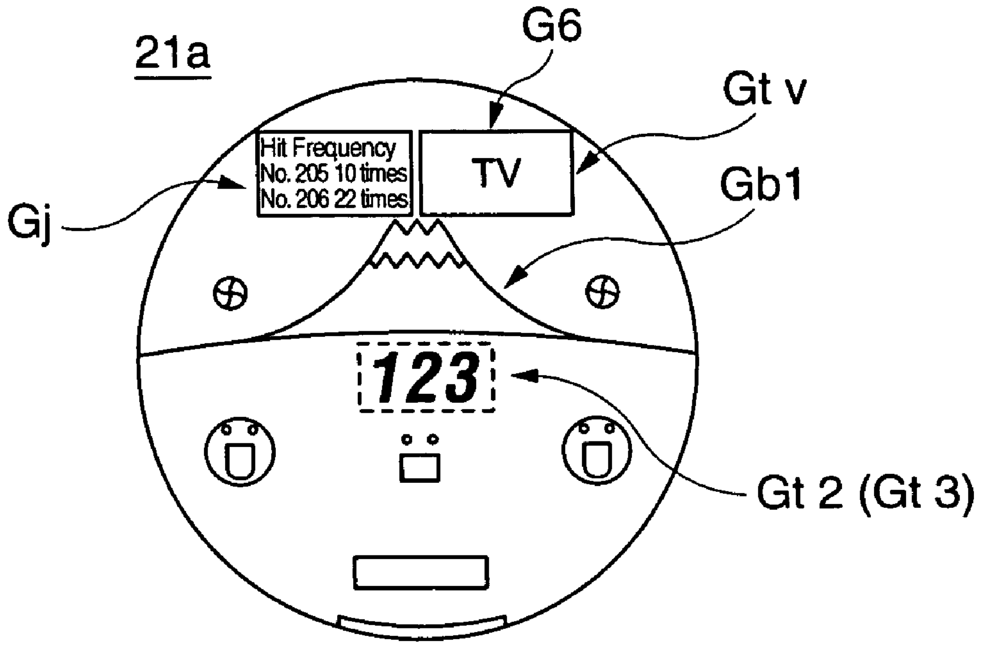
FIG. 7 is a front view of the game portion in a state where a display screen G6 is displayed.

Subsequently, when "Machine information" has been selected through the changeover operation of the changeover switch 7 by the player, the image changeover signal S4 is outputted by the changeover switch 7. On this occasion, the main control unit 3 outputs the command C2 for projection displaying the machine information image Gj shown in FIG. 5, to the display control unit 12. In compliance with this command, the display control unit 12 generates machine information image data on the basis of the machine information image signal S1 inputted from outside the pachinko machine 1, and it outputs the displaying image data Dg in which the generated machine information image data, the moving image data Dt and the still image data Db are combined. Thus, a display screen G4 in which the machine information image Gj, the moving image Gt2 (or moving image Gt3) and the still image Gb1 are combined as shown in FIG. 5, is projection displayed. In this case, when "Television" has been selected through the changeover operation of the changeover switch 7, the main control unit 3 outputs the command C2 for projection displaying the television image Gtv. In compliance with this command, the display control unit 12 generates television image data on the basis of the television image signal S2 inputted from outside the pachinko machine 1, and it combines the generated television image data, the moving image data Dt and the still image data Db so as to output the displaying image data Dg. Thus, a display screen G5 in which the television image Gtv, the moving image Gt2 (or moving image Gt3) and the still image Gb1 are combined as shown in FIG. 6, is projection displayed. When "Machine information+Television" has been selected through the changeover operation of the changeover switch 7, the main control unit 3 outputs the command C2 for projection displaying the machine information image Gj and the television image Gtv. In compliance with this command, the display control unit 12 generates machine information image data and television image data, and it combines both the generated image data, the moving image data Dt and the still image data Db so as to output the displaying image data Dg. Thus, a display screen G6 in which the machine information image Gj, the television image Gtv, the moving image Gt2 (or moving image Gt3) and the still image Gb1 are combined as shown in FIG. 7, is projection displayed.

Figure 8:
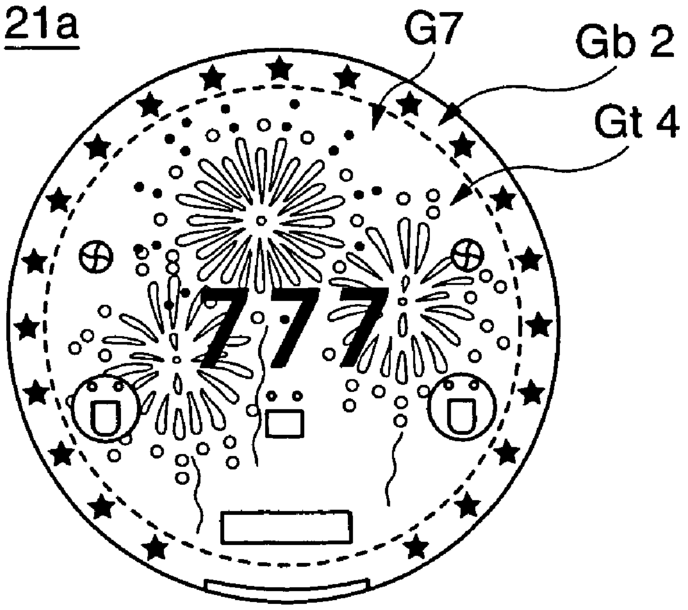
FIG. 8 is a front view of the game portion in a state where a display screen G7 is displayed.

Subsequently, when the "big prize" has occurred by the lottery, the main control unit 3 outputs the command C1 for projection displaying a display screen G7 for a big prize state. In compliance with this command, the display control unit 12 outputs the displaying image data Dg for projection displaying the display screen G7, whereby the display screen G7 in which, for example, a moving image Gt4 where fireworks are sent up and where large numerals "777" flashing, and a still image Gb2 where stars are annularly arrayed are combined, is projection displayed as shown in FIG. 8. In this case, the display area (circular area of broken line indicated in the figure) of the moving image Gt4 is set large over the whole game portion 21*a*. Consecutively, when the big prize state has ended, the main control unit 3 outputs the command C1 for projection displaying the display screen G2 (or display screen G3) shown in FIG. 4, and the display control unit 12 outputs the displaying image data Dg, whereby the display screen G2 (or display screen G3) is projection displayed again.

The main control unit 3 outputs the command C1 each time the state changes during the game, and it outputs the command C2 each time the image changeover signal S4 has been outputted by the changeover switch 7. In compliance with the command, the display control unit 12 outputs the displaying image data Dg corresponding to the one relevant display screen G2 to G7. On this occasion, the projector unit 31 emits the projection light L on the basis of the displaying image data Dg, whereby any of the display screens G2 to G7 is projection displayed on the game portion 21*a* of the game board 21. On the other hand, when the player has left the seat of the pachinko machine 1, the user sensor 6 stops outputting the sensor signal S3, and on the basis of the stop, the main control unit 3 outputs the command C1 for projection displaying the display screen G1 for the standby state as shown in FIG. 1. In compliance with this command, the display control unit 12 outputs the displaying image data Dg for projection displaying the display screen G1, whereby the display screen G1 is projection displayed again.

In this manner, according to the pachinko machine 1, the display control unit 12 causes the projector unit 31 to present the projection display while dynamically altering at least one parameter which consists of at least one of the number of the display areas of moving images, the size of each display area and the position of each display area, at a predetermined time during the display, whereby the moving images Gt2, Gt3 can be projection displayed with small sizes in the ordinary game state and the lottery state by way of example. Accordingly, even in a case where a game extends for a long time, the player can continue the game without fatigue. When the big prize, for example, has occurred, the moving image Gt4 is projection displayed with a large size, and changes in the image are made, whereby the player can continue the game without boredom.

Further, the display control unit 12 causes the projector unit 31 to present the projection display by altering at least one of the parameters which consists of the number of the display areas for projection displaying moving images, the size of each display area and the position of each display area, at the time of the change of the game state of the pachinko machine 1, whereby the moving image Gt4 is projection displayed with a large size in accordance with the change of the game state, for example, the awarding of the big prize, and the player can be reliably informed of the change of the game state. When the player has come close to or moved away from the pachinko machine 1 by a predetermined distance, the display control unit 12 alters at least one of the parameters for the projection display, whereby the moving image Gt1 for the a presentation and the moving image Gt2 for the ordinary game state, for example, can be automatically changed-over and projection display in accordance with the absence and presence of the player. Therefore, the pachinko machine 1 in the state where the player is not seated thereat (that is, the state where the game is not played) can be effectively utilized as a pachinko machine for a presentation. Further, the display control unit 12 causes the projector unit 31 to projection display the machine information image Gj, whereby various information items on the pachinko machine 1 can be offered to the player in a state where the game is continued. The display control unit 12 causes the projector unit 31 to projection display the television image Gtv, whereby the player can continue the game while enjoying television broadcasting. Therefore, the player can continue the game for a long time.

Figure 9:
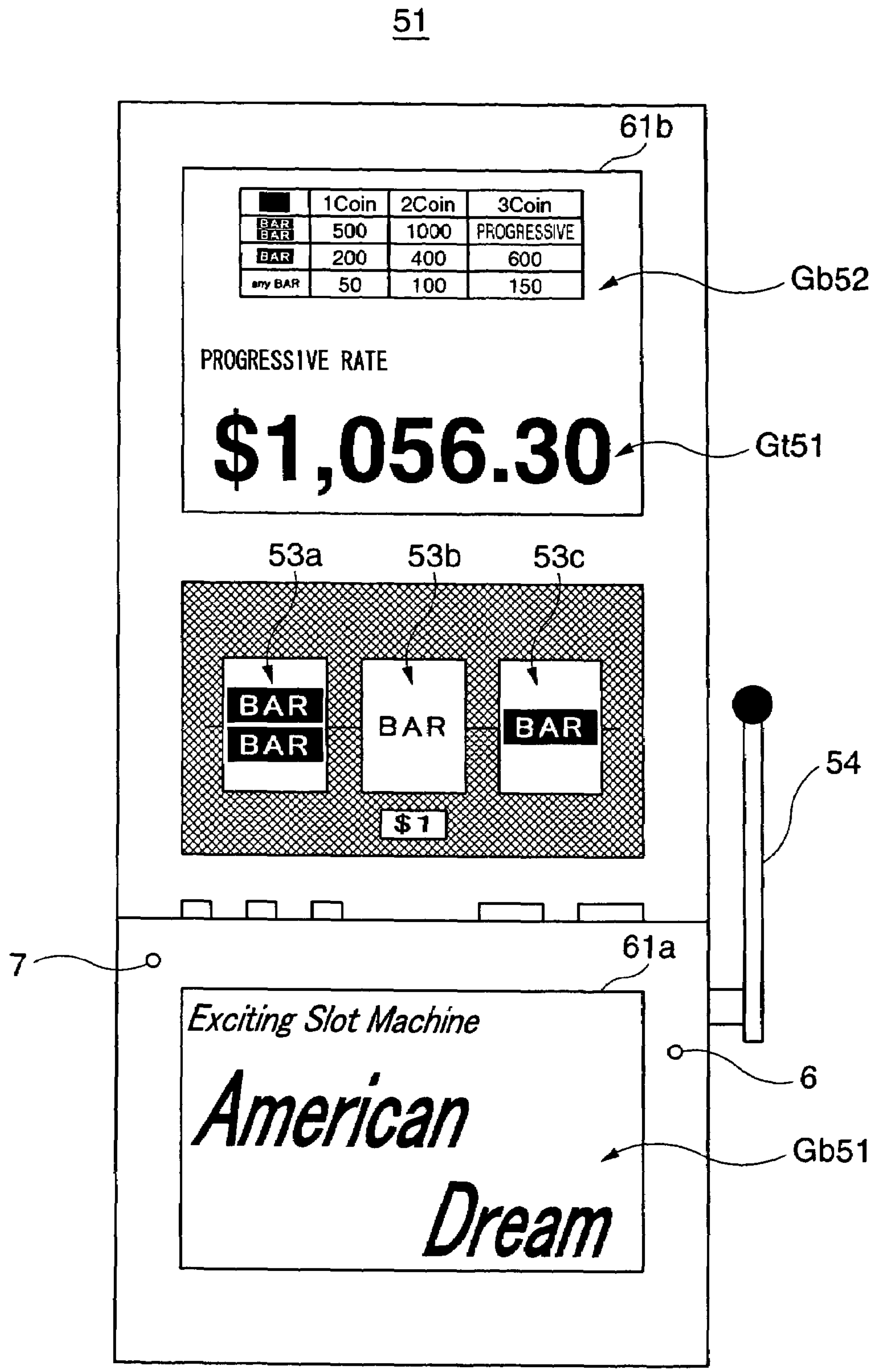
FIG. 9 is a front view showing the schematic construction of a slot machine according to another embodiment of the invention.
Figure 10:
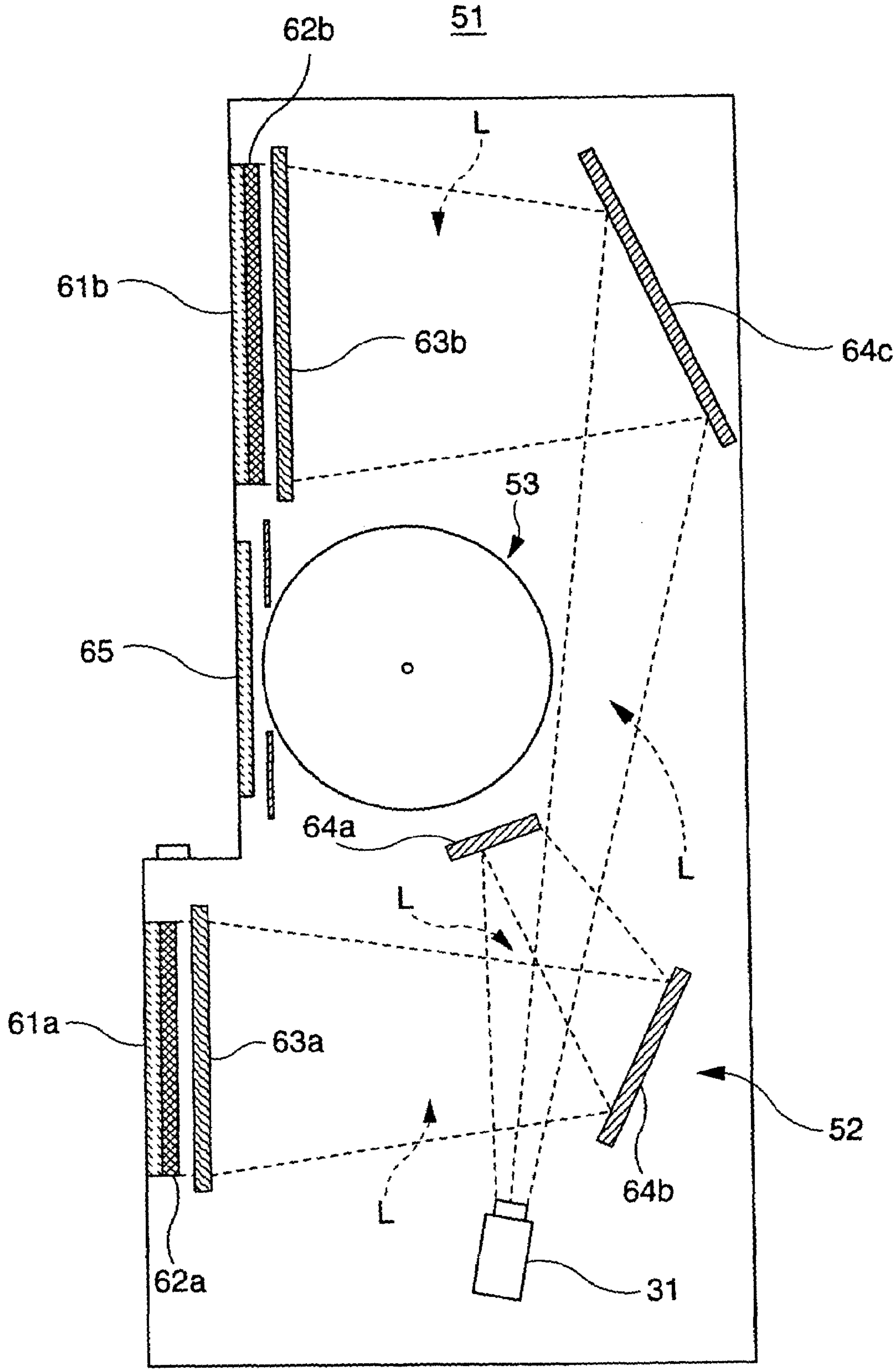
FIG. 10 is a side sectional view showing the schematic construction of the slot machine.

Next, a slot machine 51 according to another embodiment of the invention will be described with reference to the drawings. By the way, in the slot machine 51 or a pinball machine 71 to be described later, the invention is basically applied as in the pachinko machine 1. Accordingly, the same reference numerals and signs will be assigned to the same constituents as in the pachinko machine 1, and they shall be omitted from repeated description. The slot machine 51 shown in FIG. 9 is constructed with an image displaying optical unit 52 disposed inside the machine, and a reel 53, as shown in FIG. 10. Herein, the image displaying optical unit 52 includes screen films 62*a*, 62*b* which are respectively affixed on game panels 61*a*, 61*b* formed of a light transmitting resin, Fresnel lenses 63*a*, 63*b*, mirrors 64*a* to 64*c* and a projector unit 31. In this case, as shown in the figure, the mirrors 64*a*, 64*b* reflect part of the projection light L emitted by the projector unit 31, toward the Fresnel lens 63*a* (screen film 62*a*). The mirror 64*c* reflects part of the projection light L toward the Fresnel lens 63*b* (screen film 62*b*). The reel 53 is constructed with three cylindrical reels 53*a* to 53*c* (refer to FIG. 9) on each of which a plurality of patterns are depicted, and it is disposed on the rear side of a glass 65 which is disposed at the central part of the front surface of the machine, as shown in FIG. 10. In this case, the reels 53*a* to 53*c* stop after they have been rotated a predetermined number of revolutions in accordance with the manipulation of a handle 54 (refer to FIG. 9).

In the slot machine 51, in a state where a player is not seated, a main control unit 3 outputs a command C1 for projection displaying, for example, still images Gb51, Gb52 and a moving image Gt51 shown in FIG. 9. In compliance with this command, a display control unit 12 outputs displaying image data Dg in the same manner as in the foregoing pachinko machine 1. Subsequently, the projector unit 31 emits the projection light L on the basis of the displaying image data Dg. On this occasion, as shown in FIG. 10, the part of the projection light L is reflected toward the Fresnel lens 63*a* by the mirrors 64*a*, 64*b*. Part of the projection light L is reflected toward the Fresnel lens 63*b* by the mirror 64*c*. Thus, each part of the projection light L is respectively projected on the screen films 62*a*, 62*b*, whereby as shown in FIG. 9, the still image Gb51 which indicates a title (the model name of the slot machine 51) is projection displayed on the game board 61*a*, while the still image Gb52 and the moving image Gt51 which indicate the amounts of prize money are projection displayed on the game board 61*b*. In this case, the moving image Gt51 is composed of numerals which indicate the amount of the prize money in a big prize mode. The display area of the moving image Gt51 is set in a wide range on the lower side of the game board 61*b*. Next, when the player has taken the player seat, the main control unit 3 responds to a sensor signal S3 outputted by a user sensor 6 (refer to FIG. 9) and outputs the command C1 for projection displaying a still image Gb53 and a moving image Gt52 shown in FIG. 11, instead of the still image Gb52 and the moving image Gt51. Subsequently, the display control unit 12 outputs the displaying image data Dg, and the projector unit 31 emits the projection light L, whereby the still image Gb53 and the moving image Gt52 are projection displayed on the game board 61*b* as shown in the figure. In this case, the display area of the moving image Gt52 is set in a narrow range at the upper part of the game board 61*b*.

Figure 11:
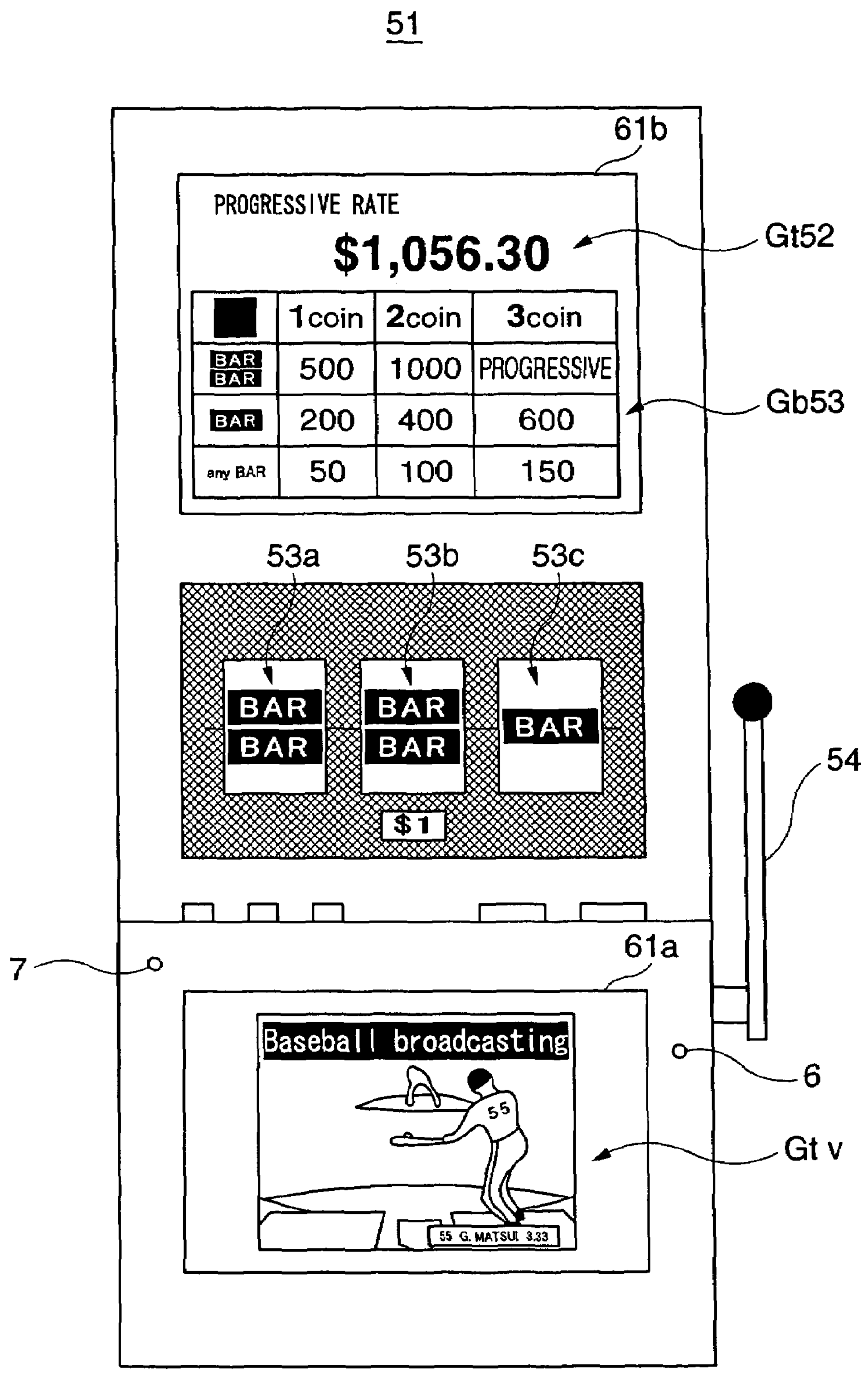
FIG. 11 is a front view of the slot machine in a state where a still image Gb53, a moving image Gt52 and a television image Gtv are displayed.

Subsequently, when "Television" has been selected through the changeover operation of a changeover switch 7 by the player, the main control unit 3 responds to an image changeover signal S4 outputted by the changeover switch 7 and outputs a command C2 for projection displaying a television image Gtv shown in FIG. 11. In compliance with this command, the display control unit 12 outputs the displaying image data Dg for projection displaying the television image Gtv on the basis of a television image signal S2 inputted from outside the slot machine 51. Thus, the television image Gtv shown in the figure is projection displayed on the game board 61*a*.

Figure 12:
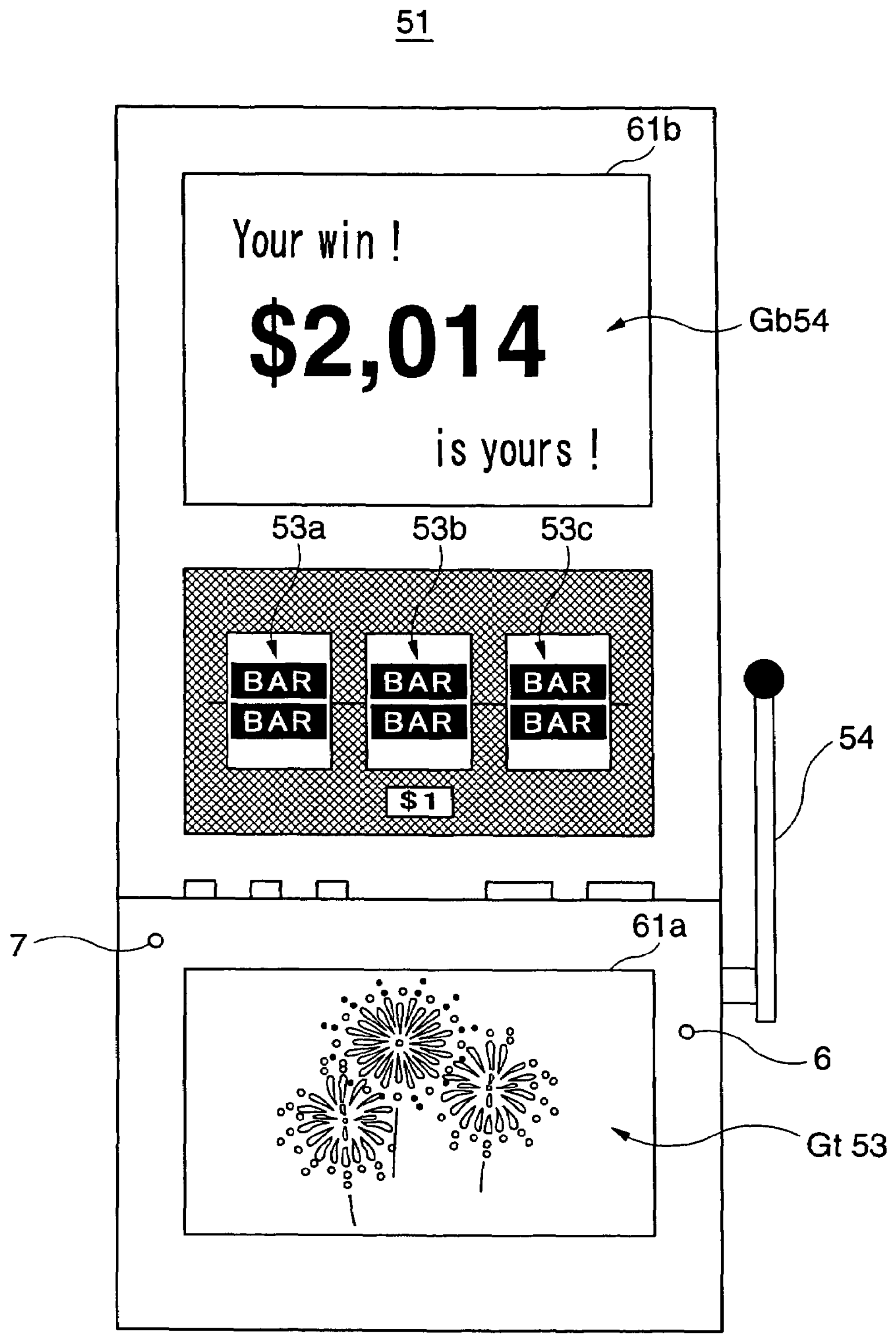
FIG. 12 is a front view of the slot machine in a state where a still image Gb54 and a moving image Gt53 are displayed.

Subsequently, when the patterns (in this case, patterns "BAR/BAR") of the reels 53*a* to 53*c* have become complete to give rise to a "big prize" as shown in FIG. 12, the main control unit 3 outputs the command C1 for projection displaying a moving image Gt53 and a still image Gb54 indicative of a large winning state as shown in the figure. In compliance with this command, the display control unit 12 outputs the displaying image data Dg, and the projector unit 31 emits the projection light L, whereby as shown in the figure, the moving image Gt53 in which fireworks are sent up by way of example is projection displayed on the game board 61*a*, while the still image Gb54 which indicates the amount of prize money to be paid back is projection displayed on the game board 61*b*. In this case, the display area of the moving image Gt53 is set in a wide range extending over the whole area of the game board 61*a*.

In this manner, also in the slot machine 51, the projection display appears, contingent with at least one parameter, which consists of at least the number of the display areas of moving images, the size of each display area, and the position of each display area, which is dynamically altered at a predetermined time during the display. In this way, even in a case where a game extends for a long time, the player can continue the game without fatigue or boredom.

The slot machine 51 is not restricted to the above construction. By way of example, a construction in which a reel image (moving image) simulative of the operation of the reel 53 and projection displayed can also be adopted instead of the reel 53. In this case, a game board and a screen film are disposed at the central part of the front surface of the machine, instead of the glass 65, and a Fresnel lens and a mirror for reflecting part of the projection light L toward the Fresnel lens are disposed on the rear side of the screen film. According to this construction, a projection display can be presented as the size of the display area of the reel image is dynamically altered at a predetermined time.

Figure 13:
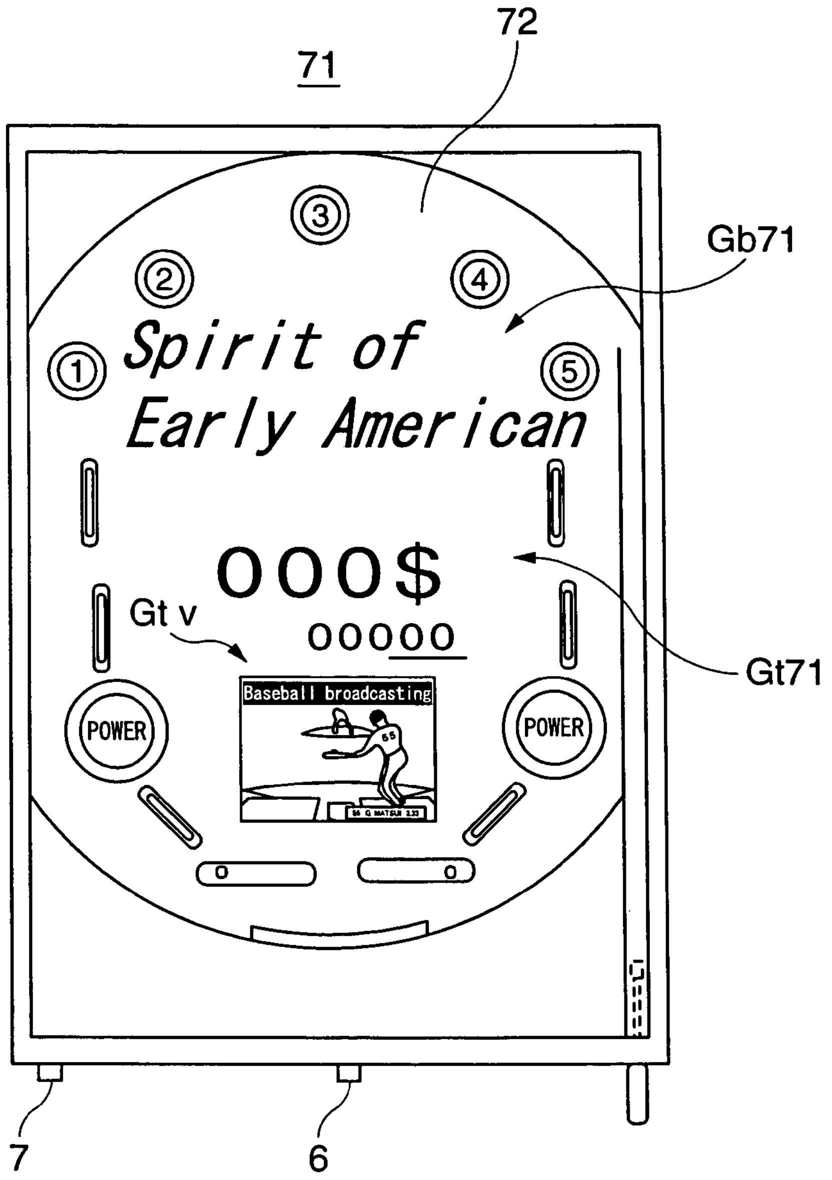
FIG. 13 is a front view showing the schematic construction of a pinball machine according to another embodiment of the invention.
Figure 14:
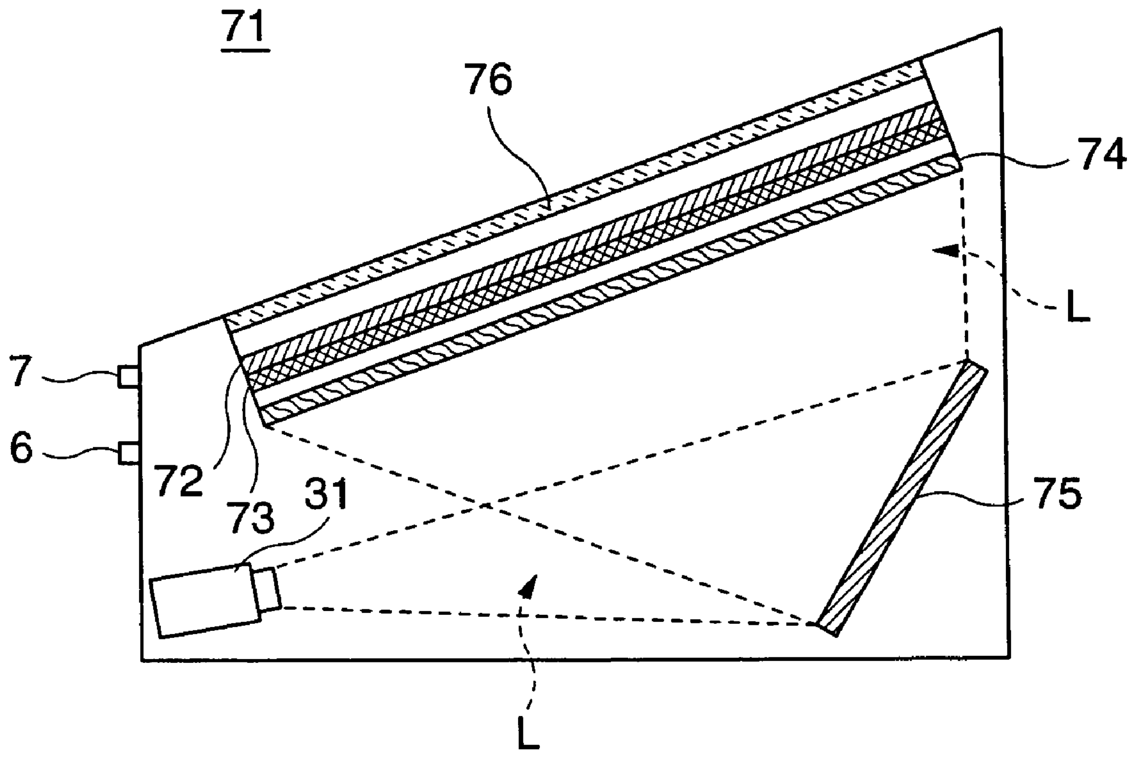
FIG. 14 is a side sectional view showing the schematic construction of the pinball machine.

Moreover, the game machine according to the invention is not restricted to the pachinko machine and the slot machine, but it includes a pinball machine, etc. By way of example, the pinball machine 71 shown in FIG. 13 is furnished with various accessories and includes a game board 72 formed of a light transmitting resin and disposed on the upper side of the machine, a screen film 73 affixed on the rear surface of the game board 72, a Fresnel lens 74, and a mirror 75, as shown in the figure and FIG. 14. With the pinball machine 71, a pinball game is played in such a way that a ball is moved between the game board 72 and a glass plate 76 disposed on the upper surface of the machine. In the pinball machine 71, a display control unit 12 outputs displaying image data Dg in compliance with commands C1, C2 outputted from a main control unit 3, and a projector unit 31 emits projection light L based on the displaying image data Dg, whereby as shown in FIG. 13, a still image Gb71, a moving image Gt71 and a television image Gtv are projection displayed on the game board 72. Also in the pinball machine 71, as in the foregoing pachinko machine 1 or slot machine 51, the projection display appears, contingent with at least one parameter, which consist of at least: the number of the display areas of moving images, the size of each display area, and the position of each display area, which is dynamically altered at a predetermined timing during the display. In this way, even in a case where a game extends for a long time, a player can continue the game without fatigue or boredom.

Further, the invention is not restricted to the foregoing embodiments thereof. By way of example, the time of the change of the game state includes various times of the change of the game state, such as the times of the awarding and the end of a so-called "reach" or "kakuhen (winning high probability mode)", and the display area for projection displaying the moving image can be enlarged or reduced at each of the times of the change. Although the example in which the display areas of the respective moving images Gt1 to Gt4 are automatically altered has been described in the embodiment of the invention, the sizes of the display areas for the respective moving images Gt1 to Gt4 can also be altered by disposing a changeover switch and through the operations of this changeover switch by the player. Further, an image to be broadcast or distributed in the invention is not restricted to the foregoing television image Gtv, but it includes also an image which is distributed through a public switched network such as the Internet. In this case, these images can be displayed as the images of both moving images and still images. The television image Gtv includes the image of television broadcasting based on ground waves, that of BS television broadcasting, that of CS television broadcasting, etc. In the embodiment of the invention, there has been described the construction in which the user sensor 6 is connected to the main control unit 3, and in which the main control unit 3 determines the approach and leaving of the player on the basis of the sensor signal S3 outputted by the user sensor 6. However, the invention is not restricted to this construction, but it is also possible to adopt a construction in which the user sensor 6 is connected to the display control unit 12, and in which the display control unit 12 determines the approach and leaving of the player on the basis of the sensor signal S3.

The entire disclosure of Japanese Patent Application Nos. 2002-191086 filed Jun. 28, 2002 and 2003-080724 filed Mar. 24, 2003 are incorporated by reference.

What is claimed is:

1. A display method comprising the steps of:

projecting at least one moving image on at least one display area in a game board of a pachinko game machine from the back of a panel;

projecting a still image on the game board outside of the at least one display area, setting a position parameter that determines a position of said at least one display area, a number parameter that determines a number of said at least one display area, and a size parameter that determines a size of said at least one display area where said at least one moving image is displayed, changing more than one of said position parameter, said number parameter, and said size parameter at a predetermined time while the at least one moving image and the still image are displayed, receiving a first image changeover signal from a changeover switch operated by a user;

projecting a game machine information image as the still image in response to said first image changeover signal, said game machine information image including a hit frequency corresponding to said pachinko game machine;

receiving a second image changeover signal from said changeover switch operated by said user;

projecting a broadcast television image as the at least one moving image in response to said second image changeover signal;

receiving a third image changeover signal from said changeover switch operated by said user;

projecting both said game information image as the still image and said broadcast television image as the at least one moving image in response to said third image changeover signal, said game machine information image including said hit frequency corresponding to said pachinko game machine.

2. A display method as defined in claim 1, further comprising the steps of:

changing more than one of said position parameter, said number parameter, and said size parameter when a player comes close to or moves away from the pachinko game machine by at least one predetermined distance.

3. A display method as defined in claim 1, further comprising the step of:

changing more than one of said parameters when a state of the pachinko game machine changes during a game.

4. A display apparatus comprising:

a projection mechanism that projects an image from a back of a game board of a pachinko game machine;

a control unit that causes the projection mechanism to projection display at least one moving image on at least one display area in the game board and causes the projection mechanism to projection display a still image on the game board outside the at least one display area, wherein said control unit sets parameters including a position parameter that determines a position of said at least one display area, a number parameter that determines a number of said at least one display area, and a size parameter that determines a size of said at least one display area where the moving image is displayed, and wherein said control unit changes more than one of the parameters at a predetermined time, while the at least one moving image and the still image are displayed; and a changeover switch connected to said control unit, said changeover switch being operable by a user to generate a first, a second, and a third image changeover signal;

wherein said control unit causes said projection mechanism to project a game machine information image as the still image in response to said first image changeover signal, a broadcast television image as the at least one moving image in response to said second image changeover signal, and both of said game machine information image as the still image and said broadcast television image as the at least one moving image in response to said third image changeover signal, said game machine information image including a hit frequency corresponding to said pachinko game machine.

5. A display apparatus for a pachinko game machine as defined in claim 4, in which said control unit causes said projection mechanism to alter at least one of said parameters when the predetermined time equals a time of a change of a game state in the game machine.

6. A display apparatus for a pachinko game machine as defined in claim 4, further comprising means for inputting said game machine information image that displays said game machine information of the pachinko game machine.

7. A display apparatus for a pachinko game machine as defined in claim 4, wherein said control unit causes said projection mechanism to alter at least one of said parameters when the predetermined time equals at least one of a time at which said control unit has determined that a player has come within a predetermined distance to the pachinko game machine, on the basis of a sensor signal outputted by a user sensor, and a time at which said control unit has determined that the player has moved away from said pachinko game machine more than a predetermined distance, on the basis of the sensor signal.

8. A pachinko game machine comprising the display apparatus for a pachinko game machine as defined in claim 4, further comprising a main control unit which causes said display apparatus for a pachinko game machine to projection display said at least one moving image and said still image.

9. A pachinko game machine as defined in claim 8 further comprising:

a user sensor that outputs a sensor signal permitting determination as to whether a player has come within a predetermined distance to said pachinko game machine;

and wherein said main control unit causes said display apparatus for a pachinko game machine to projection display said at least one moving image and said still image such that at least one of said parameters is altered when the predetermined time equals at least one of a time at which said main control unit has determined that the player has come within the predetermined distance to said pachinko game machine, on the basis of the sensor signal outputted by said user sensor, and a time at which said main control unit has determined that said player has moved away from said pachinko game machine by more than said predetermined distance, on the basis of said sensor signal.

10. A pachinko game machine comprising the display apparatus for a pachinko game machine as defined in claim 7.

11. A display method comprising the steps of:

projecting at least one moving image on at least one display area of a game board of a pachinko game machine;

projecting a still image on the game board outside of the at least one display area;

changing at least one of a position parameter that determines a position of said at least one display area, a number parameter that determines a number of said at least one display area, and a size parameter that determines a size of said at least one display area at a predetermined time while the at least one moving image and the still image are displayed;

receiving a first image changeover signal from a changeover switch operated by a user;

projecting a game machine information image as the still image in response to said first image changeover signal, said game machine information image including a hit frequency corresponding to said pachinko game machine;

receiving a second image changeover signal from said changeover switch operated by said user;

projecting a broadcast television image as the at least one moving image in response to said second image changeover signal;

receiving a third image changeover signal from said changeover switch operated by said user;

projecting both of said game machine information image as the still image and said broadcast television image as the at least one moving image in response to said third image changeover signal, said game machine information image including said hit frequency corresponding to said pachinko game machine;

wherein said predetermined time corresponds to a change in a state of a game being played on said pachinko game machine.

12. A display method as defined in claim 11, wherein said predetermined time corresponds to at least one of a player approaching said pachinko game machine and a player leaving said pachinko game machine.

13. A display method as defined in claim 11, wherein said predetermined time corresponds to a change in a state of a game being played on said pachinko game machine.

14. A display apparatus comprising:

a projection mechanism that projects an image on a game board of a pachinko game machine;

a control unit that causes the projection mechanism to project a moving image on a predetermined area of the game board and a still image on the game board outside the predetermined area at a predetermined time; and a changeover switch connected to said control unit, said changeover switch being operable by a user to generate a first, a second, and a third image changeover signal;

wherein said control unit changes at least one of a position, a number, and a size of said predetermined area at a predetermined time while the moving image and the still image are displayed and causes said projection mechanism to project a game machine information image as the still image in response to said first image changeover signal, a broadcast television image as the moving image in response to said second image changeover signal, and both of said game machine information image as the still image and said broadcast television image as the moving image in response to said third image changeover signal, said game machine information image including a hit frequency corresponding to said pachinko game machine.

15. A display apparatus for a game machine as defined in claim 14, wherein said predetermined time corresponds to a game state change in the pachinko game machine.

16. A display apparatus for a game machine as defined in claim 14, further comprising a sensor communicating with said control unit and sensing at least one of a player approaching said pachinko game machine and a player leaving said pachinko game machine and wherein said predetermined time corresponds to a signal from said sensor.

* * * * *